United States Patent
Kim et al.

(10) Patent No.: US 6,926,412 B2
(45) Date of Patent: Aug. 9, 2005

(54) PROJECTION DISPLAY APPARATUS WITH A CURVED SCREEN

(75) Inventors: Sung-gi Kim, Suwon (KR); Seok-il Yoon, Daejon (KR); Suk-sun Lee, Anyang (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 0 days.

(21) Appl. No.: 10/730,036

(22) Filed: Dec. 9, 2003

(65) Prior Publication Data

US 2004/0125345 A1 Jul. 1, 2004

(30) Foreign Application Priority Data

Dec. 28, 2002 (KR) ................. 10-2002-0086115

(51) Int. Cl.[7] .................. G03B 21/26; G03B 21/56; G03B 21/60; G02B 3/08; H04N 9/31
(52) U.S. Cl. .................. 353/94; 348/744; 359/451; 359/456; 359/457; 359/743
(58) Field of Search .................. 353/94, 30, 122; 348/744; 359/451, 456, 457, 742, 743

(56) References Cited

U.S. PATENT DOCUMENTS

| | | | | |
|---|---|---|---|---|
| 5,200,814 A | * | 4/1993 | Hirata et al. | 348/745 |
| 6,347,012 B1 | * | 2/2002 | Monson et al. | 359/451 |
| 6,469,830 B1 | * | 10/2002 | Dubin et al. | 359/449 |
| 6,623,120 B2 | * | 9/2003 | Neff et al. | 353/7 |
| 6,639,631 B1 | * | 10/2003 | Hall et al. | 3/744 |
| 6,665,118 B2 | * | 12/2003 | Yamaguchi et al. | 359/453 |
| 2003/0223113 A1 | * | 12/2003 | Starkweather | 359/451 |
| 2004/0090674 A1 | * | 5/2004 | Takahashi | 359/457 |

* cited by examiner

Primary Examiner—Judy Nguyen
Assistant Examiner—Melissa J Koval
(74) Attorney, Agent, or Firm—Sughrue Mion, PLLC

(57) ABSTRACT

A projection display apparatus with red (R), green (G), and blue (B) monochromatic cathode ray tubes (CRTs) and three projection lenses, disposed in front of the R, G, and B monochromatic CRTs respectively, along with a screen having a predetermined curvature concave in a view direction to control a view distance and focus the light rays projected from the respective projection lenses. The screen includes a Fresnel screen converting the light rays incident from the projection lenses to have predetermined optical directional characteristics in an optical axis direction, and a Lenticular screen, disposed in front of the Fresnel screen and having a curvature corresponding to the Fresnel screen, for forming images from the light rays passing through the Fresnel screen, controlling a view angle, and enhancing an entire screen luminance. The view distance is determined based on a focal length and a curvature radius of the Fresnel screen.

17 Claims, 6 Drawing Sheets

PROJECTION DISPLAY APPARATUS WITH A CURVED SCREEN

CROSS-REFERENCE TO RELATED APPLICATIONS

This application claims the benefit of Korean Application No. 2002-86115, filed Dec. 28, 2002, in the Korean Intellectual Property Office, the disclosure of which is incorporated herein by reference.

BACKGROUND

1. Field of the Invention

The present invention relates to a projection display apparatus, and more particularly to a projection display apparatus having a curved projection screen.

2. Description of the Related Art

A projection display apparatus is a system that produces images in image display devices such as specially manufactured tiny cathode ray tubes (CRTs), liquid crystal devices, or the like. The projection display apparatus enlarges and projects the images on a large screen using projection lenses, the demands of which increase day by day in response to larger screens obtained to satisfy consumers' demands.

Such a projection display apparatus is classified into a front projection type and a rear projection type depending upon projection fashions. The front projection type projects images in the same direction as the images are viewed, and the rear projection type projects images in the opposite direction to a user who views the images, that is, from the rear of the screen. The rear projection type is widely used in a form of projection TV's that can provide clear views even in bright surroundings.

Figure 1:
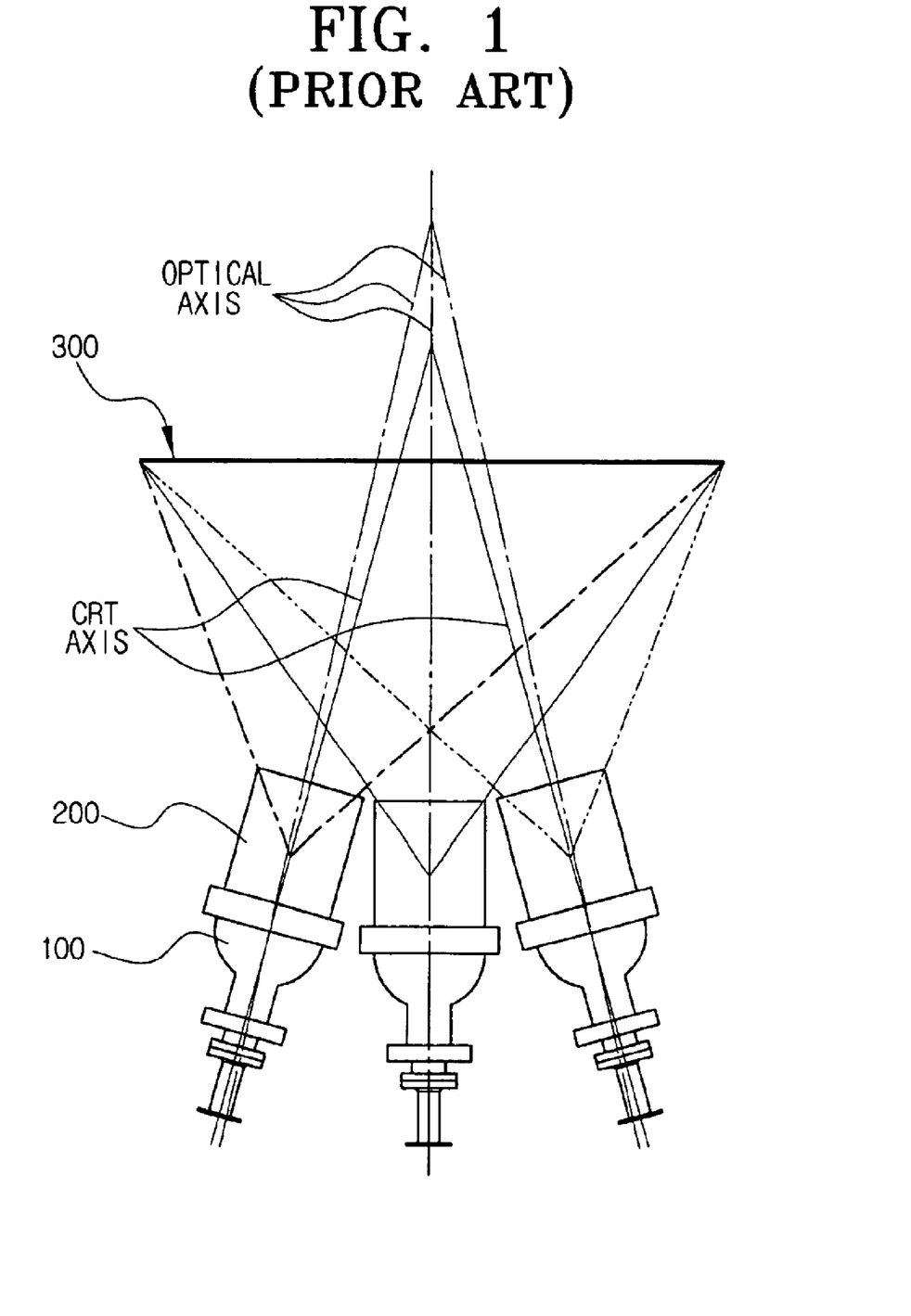
FIG. 1 is a view for showing a structure of a projection television set having a flat screen.

FIG. 1 is a view for schematically showing a structure of a conventional flat projection television set. Such a projection television set is structured to focus image sources on a flat-type large screen 300 through projection lenses 200 each having a predetermined magnification, and the image sources are formed on the fluorescent screens of red (R), green (G), and blue (B) monochromatic CRTs 100.

In the above projection display apparatus, the optical characteristics of the screen play an important role, being dominant over image quality, and are very important in the large projection television, in particular, demanding a high image quality as in a high definition (HD) television.

Figure 2:
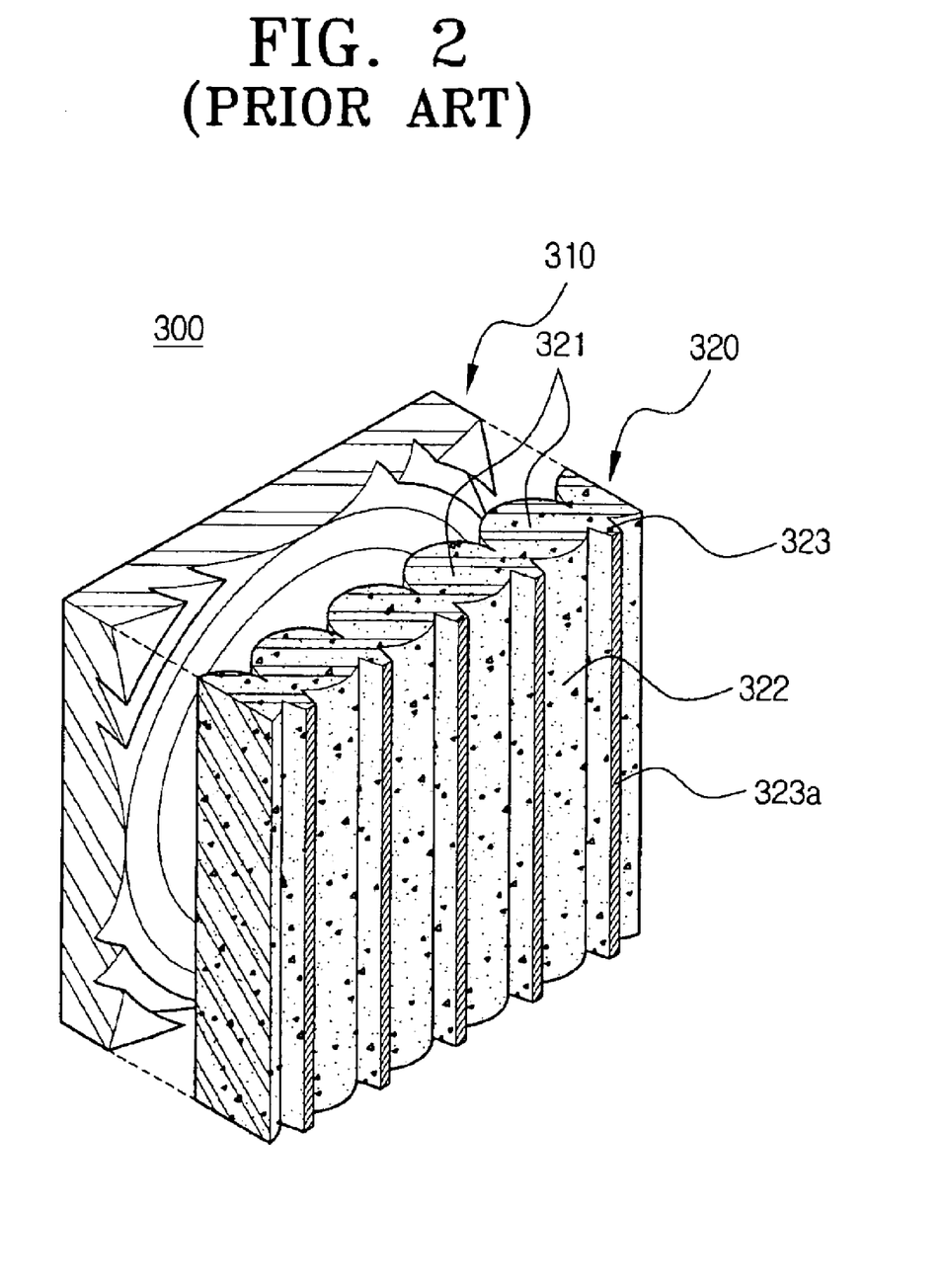
FIG. 2 is a view for showing a flat screen of FIG. 1 in detail.

FIG. 2 is a view for showing in detail a portion of the large screen 300 in a conventional projection television set of FIG. 1. In FIG. 2, the conventional screen 300 for a projector is formed with a Fresnel screen 310 and a Lenticular screen 320. With the Fresnel screen 310 and the Lenticular screen 320, the amount of light can be controlled as well as a view distance can be controlled depending upon an ambient focal length.

In order to receive respective light rays from image sources, refract the respective light rays, and display images with a nearly uniform luminance over a wide view angle, the screen 300 has a Fresnel lens 310 converting light rays magnified and incident from the projection lenses 200 into parallel light rays. In front of the surface of the Fresnel lens 310, that is, in front of the light emission surface, a Lenticular lens 320 formed with plural protrusion-type unit lenses 321 in parallel connection is disposed adjacent to the Fresnel lens 310 as a light scattering unit for scattering the parallel light rays that come out of the Fresnel lens 310 so as to form images.

Protrusions 323 are formed on the parallel junction portions of the respective protrusion-type unit lens 321 of the light emission surface of the Lenticular lens 320, and black stripes 323a are formed that are painted in black on the front sides of the protrusions 323. The protrusions 323 and the black stripes 323a absorb light from an external light source such as fluorescent lamp light, sun light, and the like, so that the contrast of images formed on the front surface of the Lenticular lens 320 can be enhanced.

A general projection television set projects light on the screen from three monochromatic CRT tubes to produce desired images. The properties of the view angle and the ambient luminance are important in such a projection television, as compared to a direct view television.

As high definition (HD) format screens have become larger and wider, in-room small theaters such as home theaters are actively being formed. Such a large and wide screen requires different concepts from the light amount controls of the existing projection television set. More specifically, since a user watches the entire wide screen in an area such as a living room and in a central location of the television set, it is preferable to have a bright screen from its central portion out to its edge portions for the user's watching.

In a light amount control structure of an existing projection television set, the concentration angle for circumferential edges is set to a remote distance rather than a short distance. This means that an existing projection television set is designed to enable plural viewers to watch programs at a large area rather than as a component of a home theater and to have a structure considering all viewing situations at plural areas of the edges of the set. The Fresnel lens has a limitation of short focal length for large and wide screens, which is because the height and slope of the Fresnel zone increase toward the edges of the Fresnel screen (from its center). Thus, it is difficult to form a short focal length at circumferential edges for a large wide screen due to the limitation of its production process.

SUMMARY OF THE INVENTION

In order to solve the above problem, it is an aspect of the present invention to provide a projection display apparatus with a curved screen, which has functions of controlling a view distance and a view angle and enables a user to view the entire screen with high luminance.

In order to achieve the above aspect and/or other features of the present invention, a projection display apparatus comprises red (R), green (G), and blue (B) monochromatic cathode ray tubes (CRTs), three projection lenses disposed in front of the R, G, and B monochromatic CRTs respectively, and for magnifying at a predetermined magnification and emitting image sources on the fluorescent screens of the R, G, and B monochromatic CRTs, and a screen having a predetermined curvature concave in a view direction to control a view distance and focusing light rays projected from the respective projection lenses.

The screen may include a Fresnel screen having a certain curvature to convert the light rays incident from the projection lenses to have predetermined optical directional characteristics in an optical axis direction, and a Lenticular screen disposed in front of the Fresnel screen and having a curvature corresponding to the Fresnel screen, and for forming images from the light rays passing through the Fresnel screen, controlling a view angle, and enhancing an entire screen luminance.

The view distance may be determined based on a focal length of the Fresnel screen and a curvature radius of the Fresnel screen.

Further, the Fresnel screen may have a curvature in at least any one of width and height directions of the Fresnel screen.

As described above, the present invention can have a function of the short view distance control appropriate for a home theater and an effect wherein the entire screen may be watched with high luminance.

BRIEF DESCRIPTION OF THE DRAWINGS

The invention will be described in detail with reference to the following drawings in which like reference numerals refer to like elements, and wherein.

DETAILED DESCRIPTION OF EXEMPLARY EMBODIMENTS

Hereinafter, exemplary embodiments of the present invention will be described in detail with reference to accompanying drawings. The described exemplary embodiments are intended to assist the understanding of the invention, and are not intended to limit the scope of the invention in any way.

Figure 3A:
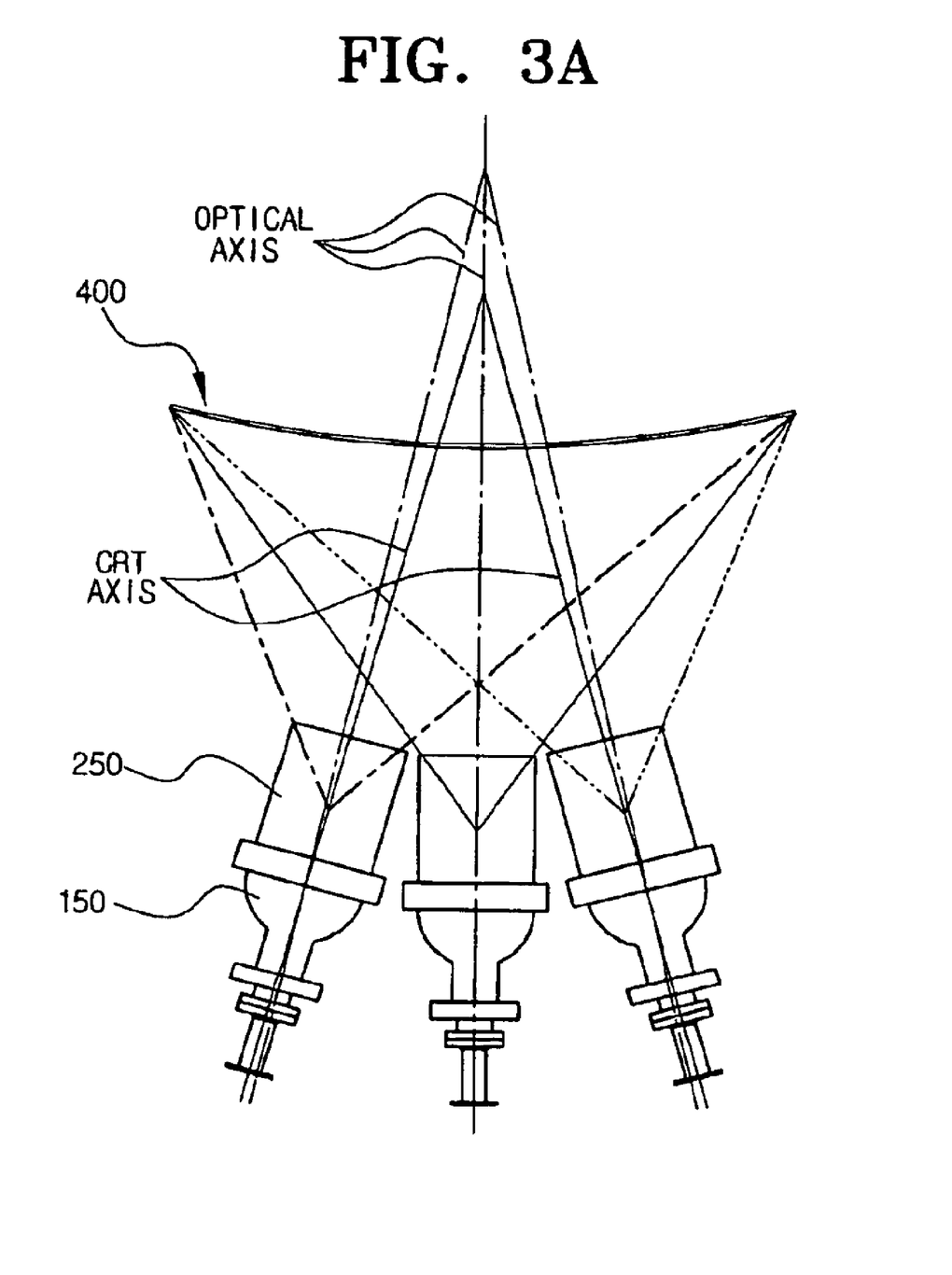
FIG. 3A is a view for schematically showing a structure of a projection television set having a curved screen with a curvature in a width direction according to an exemplary embodiment of the present invention.

FIG. 3A is a view for schematically showing a structure of a projection television set having a curved screen with a curvature in a width direction according to an exemplary embodiment of the present invention. The projection television set has three monochromatic CRTs 150, three projection lenses 250, and a large screen 400 having a certain concave curvature in the view direction. The screen 400 is formed with a Fresnel screen and a Lenticular screen each having a certain curvature for view distance controls. The Fresnel screen has a certain multi-focal length, so that the view distance can be controlled since it is systematically calculated based on the optical focus distance and the curvature radius.

Figure 3B:
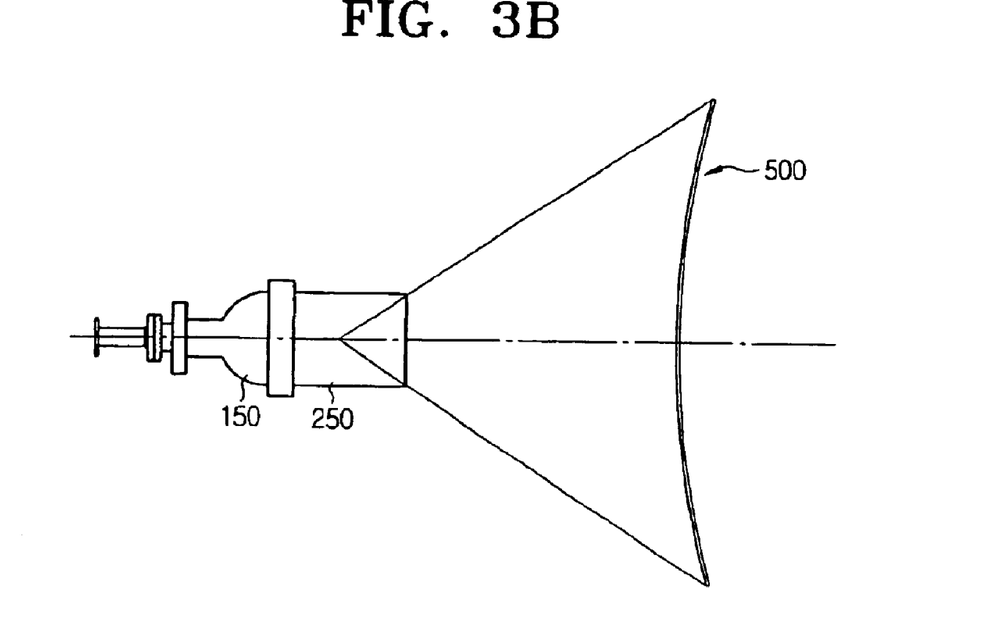
FIG. 3B is a view for schematically showing a structure of a projection television set having a curved screen with a curvature in a height directions according to an exemplary embodiment of the present invention.
Figure 3C:
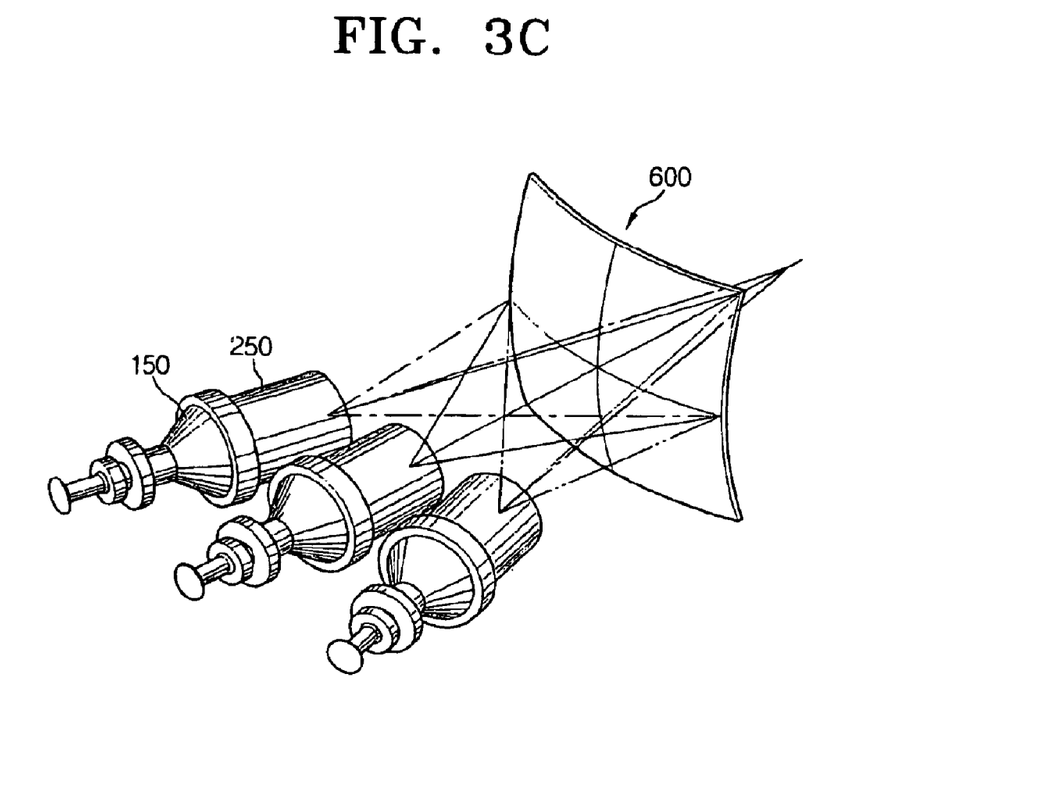
FIG. 3C is a view for schematically showing a structure of a projection television set having a curved screen with a curvature in width and height directions according to an exemplary embodiment of the present invention.

FIG. 3B is a view for schematically showing a structure of a projection television set having a curved screen with a curvature in a height direction according to an exemplary embodiment of the present invention, and FIG. 3C is a view for schematically showing a structure of the a projection television set having a curved screen with a curvature in width and height directions according to an exemplary embodiment of the present invention. The embodiments illustrated in FIGS. 3B and 3C are almost similar to that illustrated in FIG. 3A, and therefore, the similar or identical parts will not be described for the sake of brevity.

The embodiments of FIGS. 3B and 3C only differ from that of FIG. 3A in the direction of curvature of the screen 400. In other words, while FIG. 3A shows the screen 400 having curvature in a width direction only, FIG. 3B shows the screen 500 having a curvature in a height direction only, and FIG. 3C shows the screen 600 having a curvature in both width and height directions.

Figure 4:
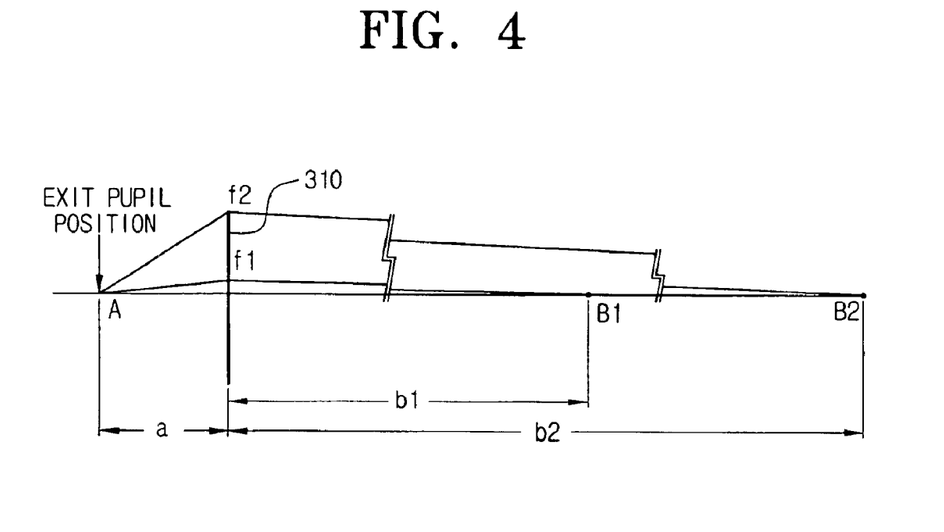
FIG. 4 is a view for showing light-ray traces in a flat Fresnel screen.

FIG. 4 is a view for showing the light-ray traces of a flat Fresnel screen 310. Of light rays incident from an exit pupil A to the Fresnel screen 310 having a multi-focus length, the light rays incident near an optical axis having a focus f1 are focused on a position B1, while the light rays incident to edge portions of the Fresnel screen having a focus f2 are focused on a position B2. Thus, in FIG. 4, a viewable range is between b1 and b2. Accordingly, the view range of a projection television is determined based on a focal length of the Fresnel screen having the multi-focal length. Such a view distance is briefly calculated based on an equation as follows:

$$f=(a*b)/(a+b) \quad \text{[Equation 1]}$$

Here, 'f' denotes a focal length of Fresnel, 'a' denotes a distance from the exit pupil to the screen, and 'b' denotes a distance from the screen to an object. The upper surface positions between bland b2 (view range) can be obtained from Equation 1, and the multi-focal distance of the Fresnel screen can be calculated based on a certain view distance.

As above, the Fresnel screen generally has a multi-focal length, so it has an aspherical surface. An equation for the aspherical surface can be expressed as below.

$$Y(r) = \frac{cr^2}{1+\sqrt{1-(1+k)r^2c^2}} + Ar^4 + Br^6 + Cr^8 + Dr^{10} \quad \text{[Equation 2]}$$

$$\frac{dY(r)}{dr} = \frac{cr}{1-\sqrt{(1+k)r^2c^2}} + 4Ar^3 + 6Br^5 + 8Cr^7 + 10Dr^9$$

Here, 'c' denotes a curvature radius, 'k' a conic constant, and 'A', 'B', 'C', and 'D' polynomial constants.

Figure 6:
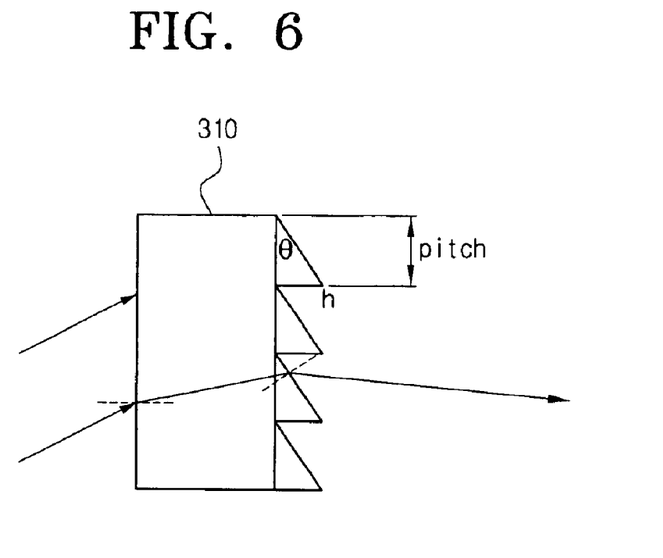
FIG. 6 is a partially enlarged view of a flat Fresnel screen of FIG. 4.

FIG. 6 is an enlarged view of a flat Fresnel screen of FIG. 4. The angle and height of Fresnel zone can be calculated as follows:

$$\theta = \tan^{-1}(dy/dr)$$

$$h = \tan(\theta)*\text{pitch} \quad \text{[Equation 3]}$$

Figure 5:
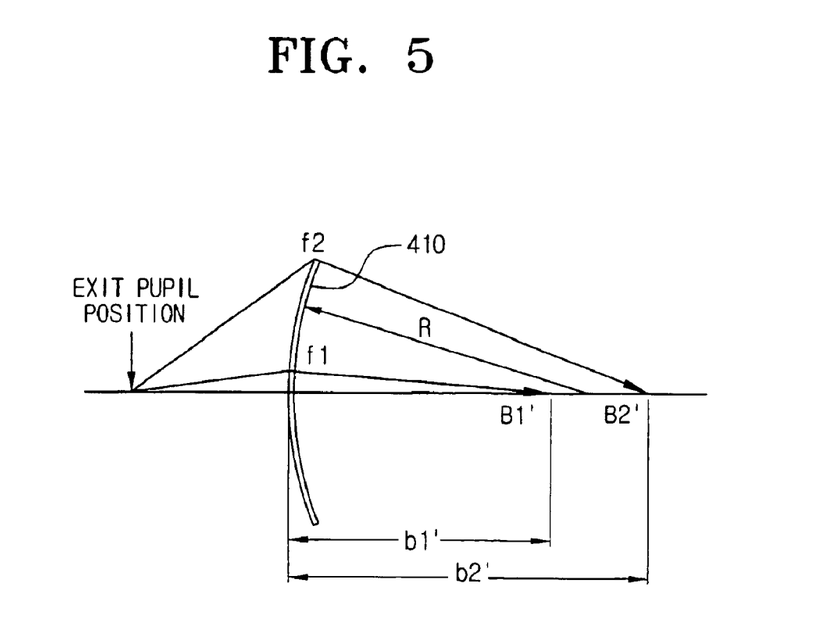
FIG. 5 is a view for showing light-ray traces in a Fresnel screen having a certain curvature.
Figure 7:
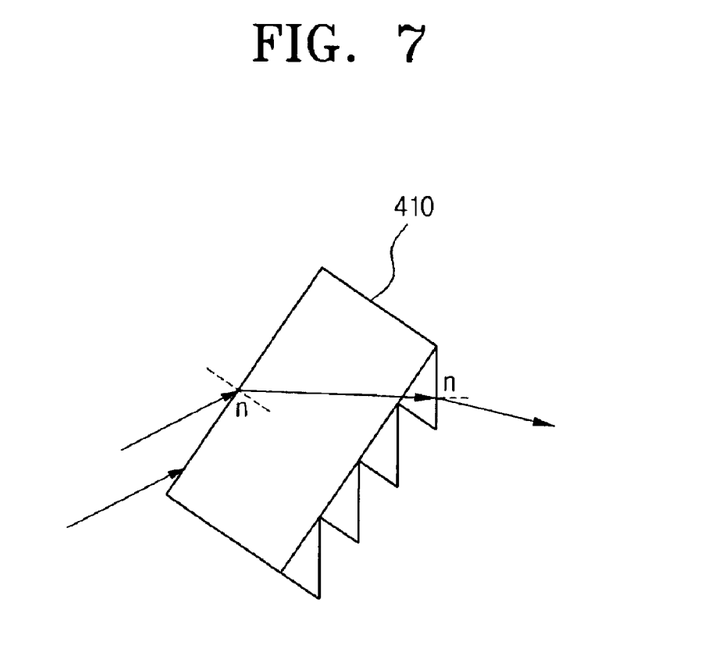
FIG. 7 is a partially enlarged view of a Fresnel screen having a certain curvature in FIG. 5.

FIG. 5 is a view for showing light-ray traces for a Fresnel screen 410 having a certain curvature, and FIG. 7 is a partially enlarged view of the Fresnel screen of FIG. 5. If the Fresnel screen 410 having the same multi-focal length as the flat Fresnel screen has a certain curvature radius R, the light rays incident from the exit pupil are focused in a range from a position B1' to a position B2'. The light rays incident to the Fresnel screen have directional characteristics in the optical axis direction due to the concave curvature in the exit pupil so that the view range becomes narrowed compared to the flat Fresnel screen, which enables a user to view the entire screen area in the view range with high luminance. That is, the use of the Fresnel screen having an optically identical focal length shortens the view distance in the range from b1' to b2', together with changing the screen from a non-curvature state to a curvature state.

The possibility of the above change means the change of an entire optical path with the light-ray-incident surface of the Fresnel screen changed to a surface having a certain curvature, which enables a screen to be formed to have the center-oriented optical directional characteristics in a small theater such as a home theater so that a user can view the entire screen with high luminance.

$$Y(r) = \frac{cr^2}{l}$$ [Equation 4]

In here, 'c' denotes a curvature radius. Further, the slopes at respective surface positions can be obtained from differential values. For a screen having a curvature, the curvature is engineeringly calculated with reference to the changes of the upper surface positions 'b1'' to 'b2'' of the screen to be changed based on basic focal lengths f1~f2 of the Fresnel screen from a flat state, which means that the viewer's optimal view range is formed in combination of the focal length of the Fresnel and the curvature of the screen. Such a combination enables the short focal length around the edges of the screen that can not be implemented for a large wide screen of existing flat Fresnel. The above optical and physical combination concept is a concept different from an optimal view distance control method which approaches in aspect of the existing optics, so that it can be applied over diverse sectors.

The focal length and view distance for the existing Fresnel lens having multi-focal length are listed below.

TABLE 1

| FOCAL LENGTH | VIEW DISTANCE |
|---|---|
| 849~915 mm | 6187~13795 mm |

The focal length and view distance for a Fresnel lens having a curvature are listed below.

TABLE 2

| Fresnel of the present invention | FOCAL LENGTH | VIEW DISTANCE |
|---|---|---|
| Curvature radius: 9950 mm<br>Thickness: 30 mm | 849 ± 20 mm | 6187 mm |

As shown in Table 1 and Table 2, the curved Fresnel screen can shorten the focal length at the circumferential edges of a wide screen to be appropriate for a home theater so that the view distance can be set to a short distance. Further, with a curved Lenticular screen corresponding to a curved Fresnel screen, the view distance can be more effectively controlled, and the view angle can be controlled to enhance the luminance of the entire screen.

As described above, the present invention has a screen with a Fresnel screen having a certain curvature and a Lenticular screen having a curvature corresponding to the Fresnel screen curvature, so that a projection display apparatus having a curved screen can be provided which enables the view distance to be controlled to a short distance appropriate for a home theater as well as enables the entire screen to be viewed with high luminance.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A projection display apparatus, comprising:
a plurality of light sources;
a projection lens disposed in front of each of the plurality of light sources for magnifying emitted light from the plurality of light sources; and
a screen having a predetermined curvature to control a view distance and focus the light rays projected from the projection lenses,
wherein the curvature is convex on a side of the screen opposite to the plurality of light sources.

2. The projection display apparatus as claimed in claim 1, wherein the plurality of light sources are red (R), green (G), and blue (B) light sources.

3. The projection display apparatus as claimed in claim 2, wherein the plurality of light sources are monochromatic cathode ray tubes (CRTs).

4. The projection display apparatus as claimed in claim 1, wherein the screen includes:
a Fresnel screen having a certain curvature to convert the light rays incident from the projection lenses to have predetermined optical directional characteristics in an optical axis direction; and
a Lenticular screen disposed in front of the Fresnel screen and having a curvature corresponding to the Fresnel screen, and for forming images from the light rays passing through the Fresnel screen, controlling a view angle, and enhancing an entire screen luminance.

5. The projection display apparatus as claimed in claim 4, wherein the view distance is determined based on a focal length of the Fresnel screen and a curvature radius of the Fresnel screen.

6. The projection display apparatus as claimed in claim 1, wherein the view distance is minimized.

7. The projection display apparatus as claimed in claim 4, wherein the Fresnel screen has a curvature in a width direction.

8. The projection display apparatus as claimed in claim 4, wherein the Fresnel screen has a curvature in a height direction.

9. The projection display apparatus as claimed in claim 4, wherein the Fresnel screen has a curvature in both a width and a height direction.

10. The projection display apparatus as claimed in claim 1, wherein the screen has a curvature in a width direction.

11. The projection display apparatus as claimed in claim 1, wherein the screen has a curvature in a height direction.

12. The projection display apparatus as claimed in claim 1, wherein the screen has a curvature in a both a height and width direction.

13. The projection display apparatus as claimed in claim 1, wherein the light rays emitted from each of the plurality of light sources are incident on the same portion of the screen.

14. A projection display apparatus, comprising:
a plurality of projection sources emitting light rays; and
a screen having a predetermined curvature shaped to control a view distance and focus the light rays projected from the projection lenses,
wherein the curvature is convex on a side of the screen facing the plurality of projection light sources,
wherein the light rays are directed by the screen toward the optical axis.

15. The projection display apparatus as claimed in claim 14, wherein the light rays emitted from each of the plurality of projection sources are incident on the same portion of the screen.

16. A projection display apparatus, comprising:

a plurality of projection light sources emitting light rays; and a screen having a predetermined curvature shaped to control a view distance and focus the light rays projected from the projection lenses, wherein the curvature is convex on a side of the screen facing the plurality of projection light sources, wherein the controlled view distance range is narrower than that of a projection display apparatus having a flat screen.

17. The projection display apparatus as claimed in claim 16, wherein the light rays emitted from each of the plurality of projection light sources are incident on the same portion of the screen.

* * * * *